(12) United States Patent
Engel et al.

(10) Patent No.: US 7,394,672 B2
(45) Date of Patent: Jul. 1, 2008

(54) DRIVE SYSTEM FOR A VEHICLE MOVING ALONG A TRACKWAY, PARTICULARLY A MAGNETIC LEVITATION TRAIN

(75) Inventors: Markus Engel, Nürnberg (DE); Reiner Meyer, Drebber (DE); Walter Sekot, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 88 days.

(21) Appl. No.: 11/402,515

(22) Filed: Apr. 12, 2006

(65) Prior Publication Data

US 2006/0238149 A1    Oct. 26, 2006

(30) Foreign Application Priority Data

Apr. 12, 2005    (DE) .................. 10 2005 017 747

(51) Int. Cl.
*H02J 3/00* (2006.01)
*B60L 13/00* (2006.01)

(52) U.S. Cl. ........................................... 363/34

(58) Field of Classification Search ............... 363/34, 363/37; 318/798–806; 104/18, 91, 94, 95, 104/281, 284, 288, 290, 292

See application file for complete search history.

(56) References Cited

U.S. PATENT DOCUMENTS

| | | | | |
|---|---|---|---|---|
| 3,874,301 | A * | 4/1975 | Alimanestianu | 104/298 |
| 4,769,751 | A * | 9/1988 | Schraudolph et al. | 363/35 |
| 5,542,356 | A * | 8/1996 | Richert et al. | 104/289 |
| 6,538,412 | B1 * | 3/2003 | Klose et al. | 318/801 |
| 6,963,796 | B2 * | 11/2005 | Larson et al. | 701/36 |
| 2005/0017696 | A1 | 1/2005 | Hauer | |

FOREIGN PATENT DOCUMENTS

| | | |
|---|---|---|
| JP | 60226795 A | 11/1985 |
| WO | 03/044611 A2 | 5/2003 |

OTHER PUBLICATIONS

Forschungsinformation Bahntechnik: Transrapid Versuchsanlage Emsland. [Research information Railroad Technology :Transrapid Experimental System Emsland] ETR-Eisenbahntechnische Rundschau 29, 7/8-1980, pp. 587-590.

(Continued)

*Primary Examiner*—Matthew V Nguyen
(74) *Attorney, Agent, or Firm*—Laurence A. Greenberg; Werner H. Stemer; Ralph E. Locher

(57) ABSTRACT

A drive system for a vehicle moving along a trackway, particularly a magnetic levitation train, includes a linear motor which has a stator extending along the trackway, and can be connected to a three-phase output voltage of an output transformer. An electrical power supply supplies a three-phase supply voltage which is converted into a three-phase alternating voltage of predeterminable frequency and amplitude by a converter unit. The alternating voltage being connected to the primary winding of an output transformer. To provide for more differentiated power adaptation it is proposed that the secondary winding of the common output transformer be provided with taps which, in transformer mode, can be connected and disconnected by a stepping switch for adjusting and correcting the desired output voltage.

5 Claims, 1 Drawing Sheet

OTHER PUBLICATIONS

Balzer, et al.: Schaltanlagen [Switchgears], 9th Edition, Published by ABB Schaltanlagen GmbH Mannheim. Düsseldorf: Cornelsen Publishing House Schwann-Giradet, ISBN 3-464-482332-2, pp. 521-523.

Sequenz: Elektrische Maschinen [Electrical Machines], 8th Edition, Wien (a.o.): Springer-Publishing House, 1971, ISBN 3-211-80971-6, pp. 79-84.

* cited by examiner

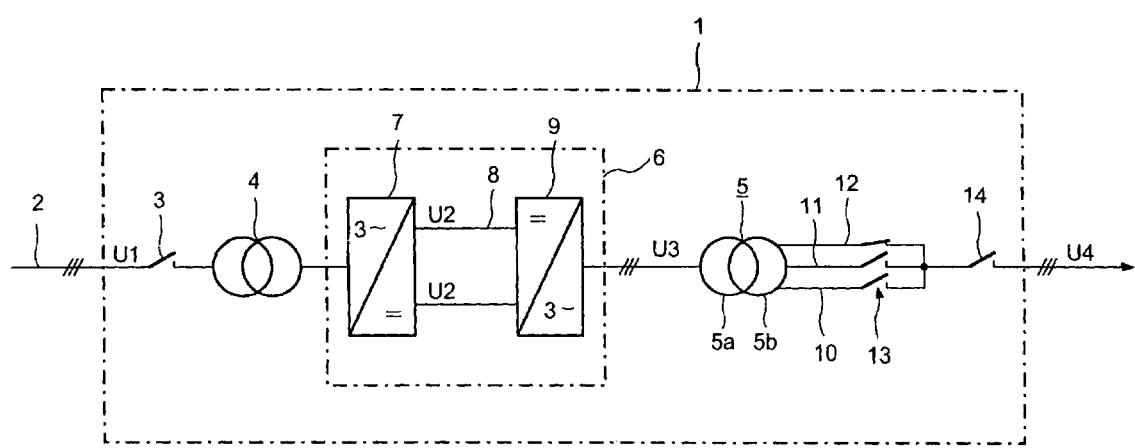

DRIVE SYSTEM FOR A VEHICLE MOVING ALONG A TRACKWAY, PARTICULARLY A MAGNETIC LEVITATION TRAIN

BACKGROUND OF THE INVENTION

Field of the Invention

The invention relates to a drive system for a vehicle moving along a trackway, particularly a magnetic levitation train. The drive system includes a linear motor which has a stator extending along the trackway, which can be connected to a three-phase output voltage of an output transformer. An electrical power supply provides a three-phase supply voltage which is converted into a three-phase alternating voltage of predeterminable frequency and amplitude by a converter unit. The alternating voltage is connected to, the primary winding of the output transformer.

Drive systems for magnetic levitation trains are known. Magnetic levitation trains have a linear motor with a stator extending along the trackway. The stator is subdivided into stator sections which can be connected synchronously with the magnetic levitation train moving along the trackway to an output transformer providing a three-phase alternating output voltage. To generate the alternating output voltage, the three-phase alternating line voltage of an electrical power system is rectified in a converter and the link voltage thus generated is converted into three-phase alternating voltages according to the predetermined frequency by inverters. The two alternating voltages are present across the primary winding of the output transformer. The three-phase alternating output voltage required for the magnetic levitation train is then available at the secondary winding of the output transformer in transformer mode; it is obtained from the voltage generated by the inverters multiplied by the transformation ratio of the output transformer. Since high alternating output voltages are needed especially for high vehicle speeds and/or long vehicles, the transformation ratio of the output transformer is dimensioned to be relatively high.

A disadvantageous factor in the known drive systems is that the available electrical power can be matched only roughly to the power requirement of the magnetic levitation train.

SUMMARY OF THE INVENTION

It is accordingly an object of the invention to provide a drive system for a vehicle moving along a trackway, particularly a magnetic levitation train, which overcomes the above-mentioned disadvantages of the prior art devices of this general type, which provides for more differentiated power adaptation.

With the foregoing and other objects in view there is provided, in accordance with the invention, a drive system for a vehicle moving along a trackway. The drive system contains an electrical power supply outputting a first three-phase supply voltage. A converter unit is provided and has a stepping switch and an output transformer with a primary winding and a secondary winding and outputs a second three-phase output voltage. The converter unit is connected to the electrical power supply for receiving the first three-phase supply voltage and converts it into a third three-phase alternating voltage of a predeterminable frequency and amplitude. The third three-phase alternating voltage is received by the primary winding of the output transformer. The secondary winding of the output transformer has taps which, in a transformer mode, are connected to and disconnected from the stepping switch for adjusting and correcting the second three-phase output voltage. A linear motor has a stator extending along the trackway and receives the second three-phase output voltage from the output transformer.

The solution of the object provides for the secondary winding of the common output transformer to be provided with taps which, in transformer mode, can be connected and disconnected by the stepping switch for adjusting and correcting the desired output voltage. The transformation ratio of the output transformer is adapted in fine stages to the power requirement of the vehicle by the stepping switch so that the converters used always provide a relatively high power. In this manner, a much greater acceleration is achieved over the entire speed range until the maximum voltage is reached at the highest selectable transformer transformation. In this manner, the traveling times can be distinctly reduced. It is also advantageous that, in spite of different transformer transformation ratios, only a single transformer operating contactor is needed. If it is not shorter traveling times but cost savings which are the main concern, the number of necessary drive components can be also correspondingly reduced.

In a structurally simple embodiment, the stepping switch is constructed as a mechanical circuit.

It is more cost effective if the stepping switch is an electronically constructed switching element with a software drive.

Good power matching is already obtained if the stepping switch is switched in dependence on the vehicle position along the trackway, the vehicle length and the vehicle speed.

Other features which are considered as characteristic for the invention are set forth in the appended claims.

Although the invention is illustrated and described herein as embodied in a drive system for a vehicle moving along a trackway, particularly a magnetic levitation train, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The single FIGURE of the drawing is a block diagram of a converter unit of a drive system according to the invention.

DESCRIPTION OF THE PREFERRED EMBODIMENT

Referring now to the single FIGURE of the drawing in detail, there is shown a drive system for a non-illustrated magnetic levitation train moving along a trackway. The drive system includes a linear motor, a stator of which extends along the trackway and is subdivided into stator sections. The individual stator sections can be connected successively in time to a three-phase alternating output voltage U4 of an output transformer 5 (primary winding 5a, secondary winding 5b). The alternating output voltage U4 is provided by a converter unit 1 which is supplied with electrical energy by a three-phase power supply system 2 of medium-voltage range.

The converter unit 1 contains an input switch 3, connected to the power supply system 2 (voltage U1), which precedes an input transformer 4. Between the input transformer 4 and the output transformer 5, a converter 6 is located.

The converter 6 has rectifiers 7 for generating an intermediate circuit DC voltage U2, a intermediate link 8 and inverters 9 which generate a three-phase alternating voltage U3 of variable frequency and amplitude from the direct voltage U2.

The alternating voltage U3 is present across the primary winding 5a of the output transformer 5. The latter has on its secondary side a multiplicity of taps 10, 11, 12; in the FIGURE, three taps 10, 11, 12 are provided. By the taps 10, 11, 12 of the secondary winding 5b of the output transformer 5, different transformation (turns) ratios can be set. The taps 10, 11, 12 are followed by a stepping switch 13 which connects one of the taps 10, 11, 12 to the output (alternating output voltage U4) of the converter unit 1 via an output switch 14. In the FIGURE, the tap 12 is connected to the output via the stepping switch 13 which in this case corresponds to the highest transformation ratio.

The stepping switch 13 is switched in dependence on the vehicle position on the trackway, the vehicle length and the vehicle speed.

This application claims the priority, under 35 U.S.C. §119, of German patent application No. 10 2005 017 747.6, filed Apr. 12, 2005; the entire disclosure of the prior application is herewith incorporated by reference.

We claim:

1. A drive system for a vehicle moving along a trackway, the drive system comprising:

an electrical power supply outputting a first three-phase supply voltage;

a converter unit having a stepping switch and an output transformer with a primary winding and a secondary winding and outputting a second three-phase output voltage, said converter unit connected to said electrical power supply for receiving the first three-phase supply voltage and converting it into a third three-phase alternating voltage of a predeterminable frequency and amplitude, the third three-phase alternating voltage being received by said primary winding of said output transformer, said secondary winding of said output transformer having taps which, in a transformer mode, being connected to and disconnected from said stepping switch for adjusting and correcting the second three-phase output voltage, each of said taps being connected in series between said secondary winding and said second three-phase output voltage by said stepping switch; and a linear motor having a stator extending along the trackway and receiving the second three-phase output voltage from said output transformer.

2. The drive system according to claim 1, wherein said stepping switch is a mechanical stepping switch.

3. The drive system according to claim 1, wherein said stepping switch is an electronically constructed switching element.

4. The drive system according to claim 1, wherein said stepping switch is switched in dependence on a vehicle position along the trackway, a vehicle length and a vehicle speed.

5. The drive system according to claim 1, wherein the vehicle is magnetic levitation train.

* * * * *